US011940959B2

(12) United States Patent
Lee et al.

(10) Patent No.: US 11,940,959 B2
(45) Date of Patent: *Mar. 26, 2024

(54) HETEROGENEOUS DISTRIBUTED FILE SYSTEM USING DIFFERENT TYPES OF STORAGE MEDIUMS

(71) Applicant: Samsung Electronics Co., Ltd., Suwon-si (KR)

(72) Inventors: Jaehwan Lee, Fremont, CA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/347,541

(22) Filed: Jun. 14, 2021

(65) Prior Publication Data
US 2021/0311913 A1 Oct. 7, 2021

Related U.S. Application Data

(63) Continuation of application No. 16/246,394, filed on Jan. 11, 2019, now Pat. No. 11,036,691, which is a
(Continued)

(51) Int. Cl.
*G06F 16/182* (2019.01)
*G06F 3/06* (2006.01)
(Continued)

(52) U.S. Cl.
CPC ........ *G06F 16/1844* (2019.01); *G06F 3/0685* (2013.01); *G06F 16/182* (2019.01); *G06F 16/185* (2019.01); *G06F 16/27* (2019.01)

(58) Field of Classification Search
CPC .. G06F 16/1844; G06F 16/182; G06F 16/185; G06F 16/27; G06F 3/0685
See application file for complete search history.

(56) References Cited

U.S. PATENT DOCUMENTS 7,035,971 B1 * 4/2006 Merchant ............ G06F 11/3452
714/E11.197
7,103,740 B1 * 9/2006 Colgrove ............ G06F 11/1458
711/161
(Continued)

FOREIGN PATENT DOCUMENTS

KR  20090026941 A  3/2009

OTHER PUBLICATIONS

Agarwal, Arpit, et al. "Heterogeneous Storages in HDFS." Aug. 13, 2013: 14. (Year: 2013).*
(Continued)

*Primary Examiner* — William Spieler
(74) *Attorney, Agent, or Firm* — Renaissance IP Law Group LLP

(57) ABSTRACT

According to one general aspect, a system may include a plurality of data nodes. Each data node may include either or both of a first storage medium and a second storage medium that is slower than the first storage medium. Each data node may be configured to store a piece data in either the first storage medium or the second storage medium. The system may be configured to store a plurality of copies of an active piece of data within two or more data nodes. A fast copy of the active piece of data may be stored by a first storage medium of a first data node. One or more slow copies of the active piece of data may be stored by respective second storage mediums of one or more respective other data nodes.

20 Claims, 7 Drawing Sheets

Related U.S. Application Data continuation of application No. 15/680,194, filed on Aug. 17, 2017, now Pat. No. 10,223,376, which is a continuation of application No. 14/474,118, filed on Aug. 30, 2014, now Pat. No. 9,773,014.

(60) Provisional application No. 62/007,390, filed on Jun. 3, 2014.

(51) Int. Cl.
*G06F 16/185* (2019.01)
*G06F 16/27* (2019.01)

(56) References Cited

U.S. PATENT DOCUMENTS

| | | | | |
|---|---|---|---|---|
| 7,493,458 | B1* | 2/2009 | Kemeny | G06F 3/0611 |
| | | | | 711/161 |
| 8,239,847 | B2 | 8/2012 | Yu et al. | |
| 8,356,050 | B1 | 1/2013 | Olston et al. | |
| 2006/0101204 | A1* | 5/2006 | Bao | G06F 3/0665 |
| | | | | 711/170 |
| 2009/0070547 | A1 | 3/2009 | Jeong et al. | |
| 2009/0210502 | A1* | 8/2009 | Ocampo | H04L 51/58 |
| | | | | 709/206 |
| 2009/0320502 | A1 | 12/2009 | Kurihara et al. | |
| 2011/0313973 | A1 | 12/2011 | Srivas et al. | |
| 2013/0024496 | A1 | 1/2013 | Krishnan et al. | |
| 2013/0104140 | A1 | 4/2013 | Meng et al. | |
| 2013/0117225 | A1* | 5/2013 | Dalton | G06F 16/119 |
| | | | | 707/623 |
| 2013/0132967 | A1 | 5/2013 | Soundararajan et al. | |
| 2013/0219405 | A1* | 8/2013 | Lee | G06F 9/5038 |
| | | | | 718/105 |
| 2013/0263142 | A1 | 10/2013 | Miyamae | |
| 2013/0282788 | A1 | 10/2013 | Hylick et al. | |
| 2013/0297624 | A1 | 11/2013 | Raghunathan et al. | |
| 2015/0092550 | A1* | 4/2015 | Christian | H04L 43/04 |
| | | | | 370/235 |
| 2015/0092561 | A1* | 4/2015 | Sigoure | H04L 49/356 |
| | | | | 370/236 |

OTHER PUBLICATIONS

Gupta, Shekhar, et al. "{ThroughputScheduler}: Learning to Schedule on Heterogeneous Hadoop Clusters." 10th International Conference on Autonomic Computing (ICAC 13). 2013. (Year: 2013).*
Krish, K. R., Ali Anwar, and Ali R. Butt. "hats: A heterogeneity-aware tiered storage for hadoop." 2014 14th IEEE/ACM International Symposium on Cluster, Cloud and Grid Computing. IEEE, 2014. (Year: 2014).*
14th IEEE/ACM CCGrid 2014, International Symposium on Cluster, Cloud and Grid Computing, May 26-29, 2014, 27 pages.
Agarwal, Heterogeneous Storages in HDFS, https://hortonworks.com/blog/heterogeneous-storages-hdfs/ (Year: 2014).
Albrecht et al., "Janus: Optimal Flash Provisioning for Cloud Storage Workloads," USENIX Association, 2013 USENIX Annual Technical Conference (USENIX ATC '13), Google, pp. 91-102.
Ananthanarayanan et al., "PACMan: Coordinated Memory Caching for Parallel Jobs," UC Berkeley, NSDI 2012, pp. 1-14.
Corrected Notice of Allowability for U.S. Appl. No. 15/680,194, dated Nov. 29, 2018.
Final Office Action for U.S. Appl. No. 14/474,118, dated Feb. 15, 2017.
Garrison, John A., and A. L. Reddy. "Umbrella file system: Storage management across heterogeneous devices." ACM Transactions on Storage (TOS) 5.1 (2009): 3. (Year: 2009).
Ghasemzadeh, Hassan, et al., "Pseudo-FIFO Architecture of LRU Replacement Algorithm." 9th International Multitopic Conference, IEEE Inmic 2005. IEEE, 2005.
Gupta, Shekhar, et al. "ThroughputScheduler: Learning to Schedule on Heterogeneous Hadoop Clusters." ICAC. 2013. (Year: 2013).
Hsiao, Hung-Chang, et al. "Load Rebalancing for Distributed File Systems in Clouds," IEEE Transactions on Parallel and Distributed Systems, vol. 24, No. 5, May 2013, pp. 951-962.
Krish, K. R. et al., "hatS: A Heterogeneity-Aware Tiered Storage for Hadoop," Cluster, Cloud and Grid Computing (CCGrid), May 2014 14th IEEE/ACM International Symposium on IEEE, 2014.
Lee, Gunho, et al., "Heterogeneity-Aware Resource Allocation and Scheduling in the Cloud," HotCloud 2011.
Nicolae, Bogdan et al., "BlobSeer: Bringing High Throughput Under Heavy Concurrency to Hadoop Map/Reduce Applications," Proceedings of the 2010 IEEEInternational Symposium on Parallel & Distributed Processing (IPDPS), 2010, 20 pages.
Notice of Allowance for U.S. Appl. No. 14/474,118, dated Jul. 10, 2017.
Notice of Allowance for U.S. Appl. No. 15/680,194, dated Oct. 11, 2018.
Notice of Allowance for U.S. Appl. No. 16/246,394, dated Feb. 12, 2021.
Office Action for U.S. Appl. No. 14/474,118, dated May 2, 2017.
Office Action for U.S. Appl. No. 14/474,118, dated Nov. 9, 2016.
Office Action for U.S. Appl. No. 15/680,194, dated Jun. 15, 2018.
Office Action for U.S. Appl. No. 16/246,394, dated Sep. 23, 2020.
Xie, Jiong, et al. "Improving MapReduce Performance through Data Placement in Heterogeneous Hadoop Clusters," Parallel & Distributed Processing, Workshops and Phd Forum (IPDPSW), 2010 IEEE International Symposium on IEEE, Apr. 2010.

* cited by examiner

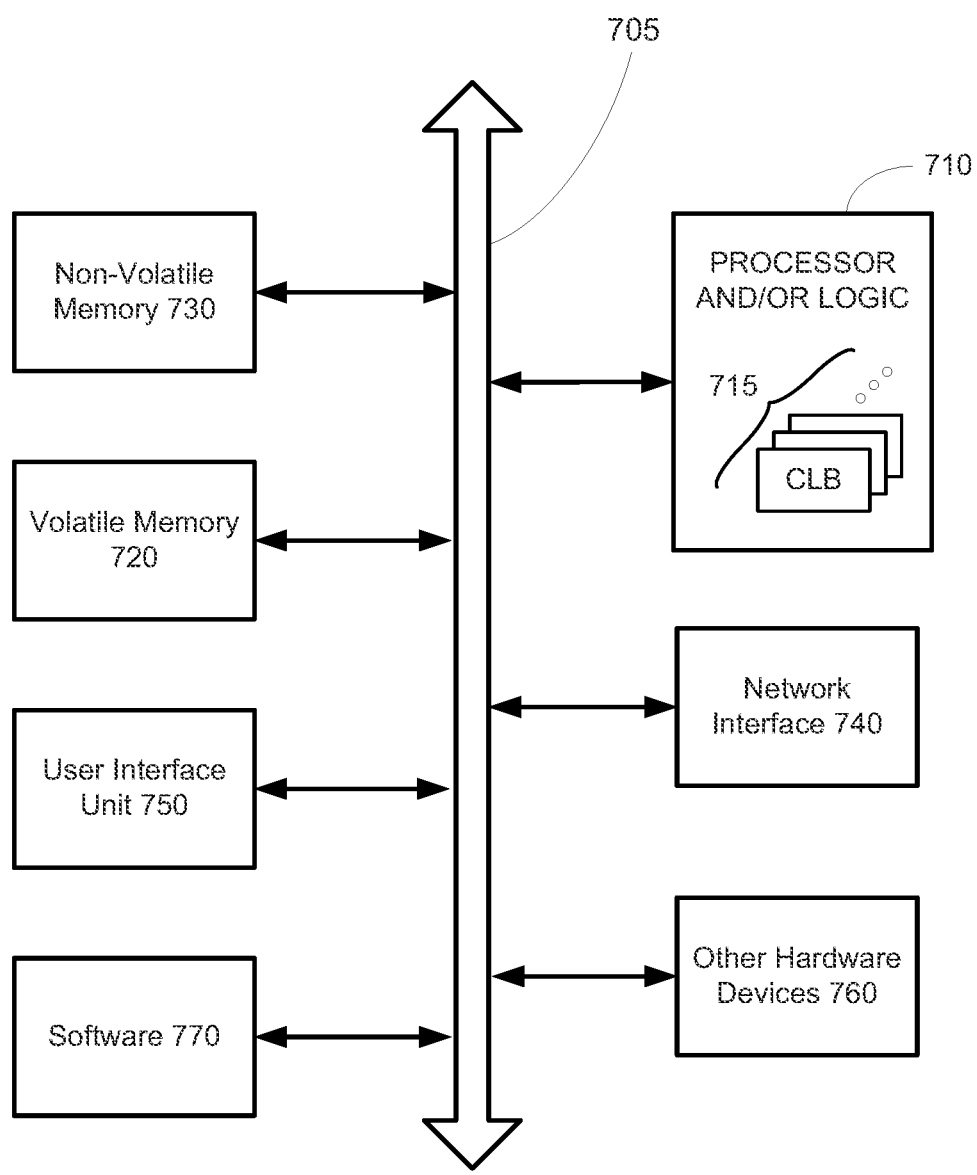

HETEROGENEOUS DISTRIBUTED FILE SYSTEM USING DIFFERENT TYPES OF STORAGE MEDIUMS

CROSS-REFERENCE TO RELATED APPLICATION

This application is a continuation of U.S. application Ser. No. 16/246,394, filed on Jan. 11, 2019, now allowed, which is a continuation of U.S. application Ser. No. 15/680,194, filed on Aug. 17, 2017, now U.S. Pat. No. 10,223,376, issued Mar. 5, 2019, which is a continuation of U.S. application Ser. No. 14/474,118, filed on Aug. 30, 2014, now U.S. Pat. No. 9,773,014, issued on Aug. 26, 2017, which in turn claims the priority benefit, under 35 U.S.C. § 119, of U.S. Provisional Application Ser. No. 62/007,390, filed on Jun. 3, 2014. The subject matter of these earlier filed applications are hereby incorporated by reference.

TECHNICAL FIELD

This description relates to storing information, and more specifically, storing information within a distributed file system.

BACKGROUND

Distributed computing is generally a field of computer science that studies or utilizes distributed systems. A distributed computing system is traditionally a system in which components located on networked computers communicate and coordinate their actions by passing messages amongst themselves. The components interact with each other in order to achieve a common goal. General characteristics of distributed systems may include concurrency of components, lack of a global clock, and allowances for independent failure of components. Examples of distributed systems vary from massively multiplayer online games to peer-to-peer applications.

The word "distributed" in terms such as "distributed system", "distributed programming", "distributed file system", etc. originally referred to computer networks where the individual computers were physically distributed within some geographical area. The term is nowadays used in a much wider sense, and often refers to autonomous processes that run within the same physical location and interact with each other by message passing.

A distributed computing system may have a common goal, such as solving a large computational problem. For example, in some distributed systems, the computational problem may be broken down into a plurality of smaller tasks that may be executed simultaneously or in parallel, and these tasks may be assigned to various computers of the distributed system. In such a system, the larger computational problem may be solved more quickly by leveraging the execution power of the distributed system to process the problem substantially in parallel, as opposed to a single computer processing the problem sequentially.

SUMMARY

According to one general aspect, a system may include a plurality of data nodes. Each data node may include either or both of a first storage medium and a second storage medium that is slower than the first storage medium. Each data node may be configured to store a piece data in either the first storage medium or the second storage medium. The system may be configured to store a plurality of copies of an active piece of data within two or more data nodes. A fast copy of the active piece of data may be stored by a first storage medium of a first data node. One or more slow copies of the active piece of data may be stored by respective second storage mediums of one or more respective other data nodes.

According to another general aspect, a method of storing data in a plurality of data nodes may exist. Each data node may include either or both of a first storage medium and a second storage medium that is slower than the first storage medium. Each data node may be configured to store a piece data in either the first storage medium or the second storage. The method may include storing a fast copy of an active piece of data within a first storage medium of a first data node. The method may also include storing one or more slow copies of the active piece of data within respective second storage mediums of one or more respective other data nodes.

According to another general aspect, a method may include arranging a heterogeneous distributed file system into multiple tiers of data storage. The multiple tiers may include a fast tier comprising a first type of storage medium, and a slower tier comprising a second type of storage medium. The method may include preferably or preferentially storing active data within the fast tier. The method may also include preferably or preferentially storing inactive data within the slow tier.

The details of one or more implementations are set forth in the accompanying drawings and the description below. Other features will be apparent from the description and drawings, and from the claims.

A system and/or method for storing information, and more specifically, storing information within a distributed file system, substantially as shown in and/or described in connection with at least one of the figures, as set forth more completely in the claims.

BRIEF DESCRIPTION OF THE DRAWINGS

FIG. 7 is a schematic block diagram of an information processing system that may include devices formed according to principles of the disclosed subject matter.

Like reference symbols in the various drawings indicate like elements.

DETAILED DESCRIPTION

Figure 1:
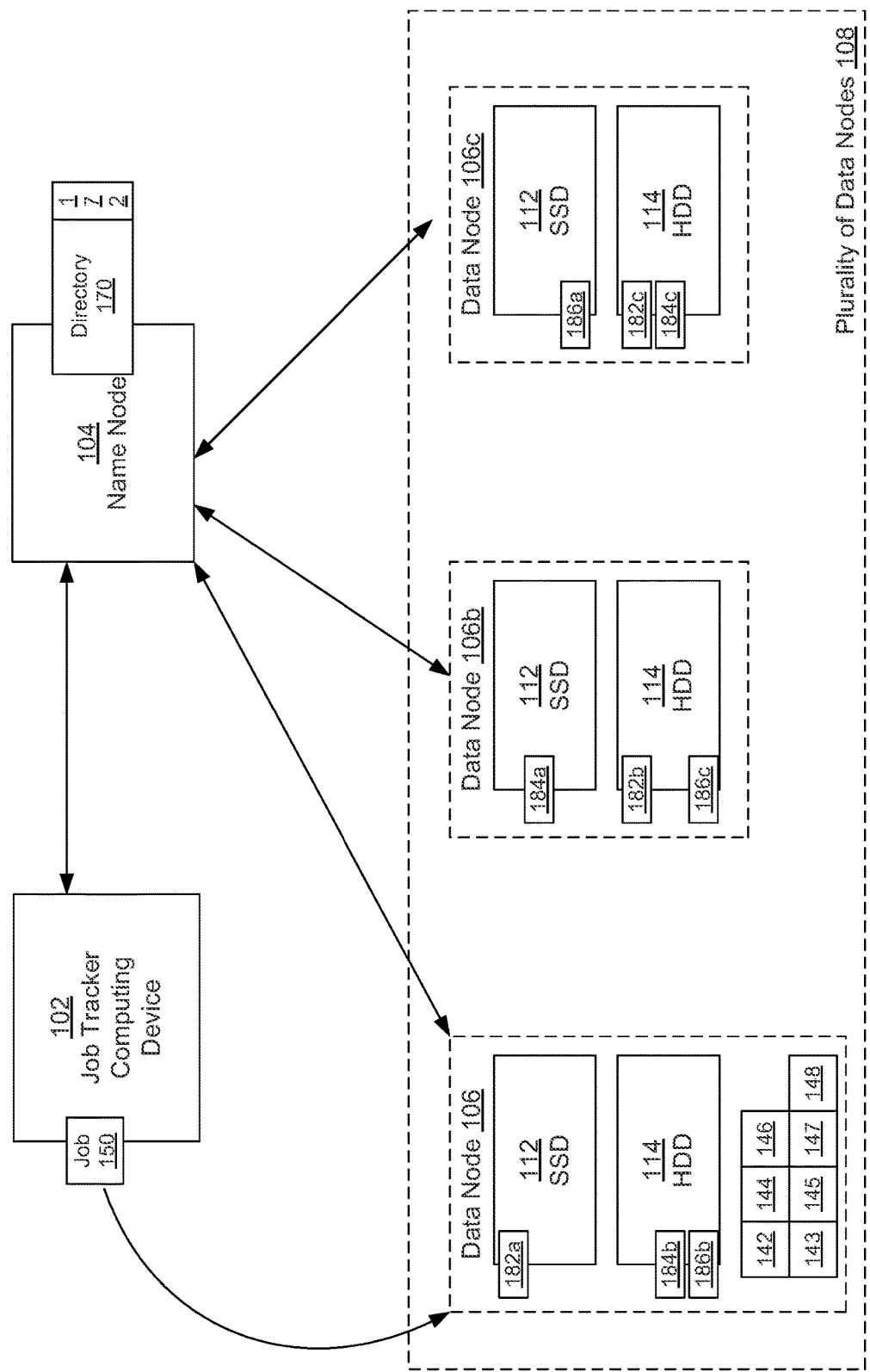
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Often, modern distributed computing systems make use of their own file system (as opposed to an operating system level file system, e.g., NTFS (New Technology File System), fourth extended file system (ext4), etc.). Traditionally, such distributed file systems assume that the storage mediums that comprise the file systems are homogeneous. That is, it is assumed by the distributed file system that all the storage mediums employ the same basic technology (e.g., an electro-magnetic hard drive, a non-mechanical solid-state or flash drive, etc.). Further, often, the distributed file system assumes that all storage mediums are the same size or virtualized to the same size (e.g., storage space of any larger drives is ignored, smaller drives may be grouped into a larger virtual drive, etc.).

Often, a distributed file system may span multiple devices (e.g., data nodes, etc.) and be physically located across a plurality of computing devices. A distributed file system may allow data to be accessed regardless of what physical computing device it is stored upon. Further, a distributed file system may unburden an accessing computing device from the need to know the physical location of the data. Traditionally, the computing device may request data access (e.g., a read, a write, etc.) and the data access may be performed without informing the computing device of the details involved in storing or retrieving the requested data. Conversely, in some embodiments, the distributed file system may include an intermediary or data manager (e.g., a name node) whose function is to direct data access requests to the correct physical computing device or data node. In these cases, the requesting computing device may be provided some detail as to the storage employed for the data (e.g., a storage address, a data node address, etc.) It is understood that the above are merely a few illustrative examples to which the disclosed subject matter is not limited.

Further, distributed file systems often exist within a distributed computing system. As described above, a distributed computing system may include a plurality of computing devices capable of executing or processing a computing job or task. Often this job is a smaller piece of a larger computing task (e.g., compiling a large program, solving a mathematical problem, analyzing a large set of data, etc.). In such an embodiment, the storage medium may be included by a computing device that is also capable of performing one or more of the distributed computing jobs. It is understood that the above are merely a few illustrative examples to which the disclosed subject matter is not limited.

FIG. 1 is a block diagram of an example embodiment of a system 100 in accordance with the disclosed subject matter. In the illustrated embodiment, a distributed file system is shown. In this context, a "file system" includes a data structure or data structures that organizes and/or controls the storage of various pieces of data such that the data is relatively accessible (e.g., may be read from, written to, etc.). In general, file systems include directory structures, and the concept of files and storage addresses or locations, etc.

In the illustrated embodiment, the distributed file system 100 may include a name node 104 and a plurality of data nodes 108. In various embodiments, the plurality of data nodes 108 may include one or more data nodes 106 (three being illustrated in FIG. 1). As described above, these data nodes 106 may be substantially identical, or of varying degrees of dissimilarity. Further, in various embodiments, these data nodes 106 may be physically co-located, geographically disbursed, or a combination thereof.

In some embodiments, a data node 106 may include a computing device, such as, for example, a laptop, desktop, workstation, blade server, network storage device, smartphone, tablet, and other appropriate computers, etc. or a virtual machine or virtual computing device thereof. In various embodiments, the data node 106 may include a processor 142 configured to execute one or more machine executable instructions or pieces of software, firmware, or a combination thereof. The data node 106 may include, in some embodiments, a memory 144 configured to store one or more pieces of data, either temporarily, permanently, semi-permanently, or a combination thereof. Further, the memory 144 may include volatile memory, non-volatile memory or a combination thereof. In various embodiments, the data node 106 may include a storage medium 145 configured to store data in a semi-permanent or substantially permanent form. In various embodiments, the storage medium 145 may be included by the memory 144. In some embodiments, the storage medium 145 may separate from the storage mediums 112 and 114, described below or a partition thereof. In such an embodiment, the storage medium 145 may store the operating system 147, etc. of the data node 106.

In various embodiments, the data node 106 may include one or more network interfaces 146 configured to allow the data node 106 to be part of and communicate via a communications network. For example, the network interface may be a WiFi interface, a cellular interface, or a wired interface, amongst others. Examples of a Wi-Fi protocol may include, but are not limited to: Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to: IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

In various embodiments, the data node 106 may include one or more other hardware components 143 (e.g., a display or monitor, a keyboard, a mouse, a camera, a fingerprint reader, a video processor, etc.). It is understood that the above are merely a few illustrative examples to which the disclosed subject matter is not limited.

In various embodiments, the data node 106 may include an operating system (OS) 147 configured to provide one or more services to an application 148 (e.g., an distributed application, a text editor, etc.) and manage or act as an intermediary between the application 148 and the various hardware components (e.g., the processor 142, a network interface 146, etc.) of the data node 106. In such an embodiment, the data node 106 may include one or more native applications, which may be installed locally (e.g., within the storage medium 145, etc.) and configured to be executed directly by the processor 142 and directly interact with the OS 147. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 142.

Likewise, the name node 104 may include similar hardware and/or software components as the data node 106 (e.g., processor 142, OS 147, etc.). In some embodiments, the name node 104 may also include a data node 106. It is understood that the above is merely one illustrative example to which the disclosed subject matter is not limited.

In the illustrated embodiment, each data node 106 may include a first storage medium 112 and a second storage medium 114. In various embodiments, the second storage medium 114 may be significantly slower than the first storage medium 112. For example, the first storage medium 112 may include a write speed of 200 megabits per second (MB/s) up to 550 MB/s, whereas the second storage medium 114 may include a write speed of 50-120 MB/s. In such an embodiment, the first storage medium 112 may be considered 4 to 11 times faster than the second storage medium 114. In such an embodiment, the second storage medium 114 may have a lower read and/or write latency than the first storage medium 112. In one such embodiment, this may result in a reduced or relatively low read latency during a task mapping phase of the distributed computing system. It is understood that the above are merely illustrative examples to which the disclosed subject matter is not limited.

In the illustrated embodiment, the first storage medium 112 may employ a first technology, such as, for example, Flash storage, solid-state storage, or more generally a non-mechanical storage technology, etc. Conversely, the second storage medium 114 may employ a second technology, such as, for example, magnetic storage, optical storage, an electro-mechanical storage technology, etc. It is understood that the above are merely a few illustrative examples to which the disclosed subject matter is not limited.

As a non-limiting convention and simply by way of convenience, and more comprehensible illustration, herein the first storage medium 112 will be referred to as a solid-state drive (SSD) 112, and the second storage medium 114 will be referred to as a hard disk drive (HDD) 114. It is understood that the above are merely a few illustrative examples to which the disclosed subject matter is not limited.

In various embodiments, other differences may exist between the two storage mediums (i.e., SSD 112 and HDD 114) besides or in addition to speed (e.g., access time, write, time, read time, bandwidth, etc.), such as, for example, cost, mean-time-between-failure, number of write operations to a given storage location, etc. In some embodiments, one or more of these differences may derive from the underlying storage technologies employed by the respective storage mediums (e.g., magnetic, non-magnetic, etc.). It is understood that the above are merely a few illustrative examples to which the disclosed subject matter is not limited.

In the illustrated embodiment, the plurality of data nodes 106 may store various pieces of data (e.g., data 182, 184, and 186, etc.). In a traditional homogeneous distributed file system, all of the pieces of data would be stored in single type of storage medium of the data nodes 106 (e.g., HDD 114). However, in the illustrated embodiment, the heterogeneous distributed file system 100 may be configured to store the data in the faster first storage medium (SSD 112), if possible or otherwise desirable (e.g., as determined by a predetermined set of rules, etc.), and store data in the slower second storage medium (HDD 114) in other cases. It is understood that the above is merely one illustrative example to which the disclosed subject matter is not limited.

In such an embodiment, the faster SSD 112 storage may be employed as a first tier to the heterogeneous distributed file system, and the slower HDD 114 storage may be employed as a second tier to the heterogeneous distributed file system. In various embodiments, this may allow distributed computing system to process jobs more quickly (e.g., data access may take less time, affecting the time to complete the job, etc.).

As described in more detail below, in reference to FIG. 4, data that is currently being accessed or expected to soon be accessed (i.e. active, etc.) may be stored in the faster SSD 112, and data that is not being accessed or not expected to soon be accessed (i.e. inactive) may be stored in the slower HDD 114. For example, in one embodiment, the fast SSD 112 storage medium may be relatively expensive and small (i.e. have a small number of storage addresses, e.g., 512 GB, etc.), whereas the slow HDD 114 storage medium may be relatively cheap and large (i.e. have a comparatively large number of storage addresses, e.g., 4 Tb, etc.). In such an embodiment, it may not be practical or desirable to build a homogeneous distributed file system exclusively out of the faster SSD 112s. In one embodiment, the heterogeneous distributed file system may employ the faster SSD 112s in a tiered or caching manner in which immediately useful or active data is stored in the fast but small tier (SSD 112) and data that is not immediately useful or is inactive may be stored in a slower but larger tier (HDD 114). It is understood that the above are merely a few illustrative examples to which the disclosed subject matter is not limited.

In various embodiments, the distributed file system 100 may include data redundancy. Traditionally, data failure or corruption is a concern of file systems. In the illustrated embodiment, the distributed file system 100 may seek to ameliorate or prevent such data failure by storing multiple copies of a single piece of data. In various embodiments, the distributed file system 100 may be configured to store each copy in a separate data node 106.

For example, in the illustrated embodiment, the data 182 may be stored three times: once in data node 106 (as data 182a), a second time in data node 106b (as data 182b), and a third time in data node 106c (as data 182c). Likewise, data 184 may be stored once in data node 106b (as data 184a), a second time in data node 106 (as data 184b), and a third time in data node 106c (as data 184c). Finally, data 184 may be stored once in data node 106c (as data 186a), a second time in data node 106 (as data 186b), and a third time in data node 106c (as data 186c).

In such an embodiment, if a single data node fails (e.g., data node 106b is turned off unexpectedly, etc.), the data 182, 184, and 186 will still be available within the distributed file system 100. Further, if a second data failure occurs (e.g., the HDD 114 of data node 106c fails, etc.), the data 182, 184, and 186 will still be available within the distributed file system 100. It is understood that the above is merely one illustrative example to which the disclosed subject matter is not limited.

As described above, in one embodiment, if a piece of data is active, all copies of that data (e.g., data 182a, 182b, and 182c, etc.) may be moved or stored within the faster SSD 112. Likewise, in such an embodiment, if a piece of data is inactive, all copies of that data (e.g., data 182a, 182b, and 182c, etc.) may be moved or stored within the slower HDD 114. It is understood that the above is merely one illustrative example to which the disclosed subject matter is not limited.

In the illustrated embodiment, the distributed file system 100 may be configured to take advantage of the heterogeneous nature of the file system in order to provide the data (e.g., data 182, etc.) with the greatest speed and chosen reliability (e.g., three copies of each piece of data, etc.), but while reducing the amount of storage space required to store the data within the first, faster tier SSD 112.

Figure 5:
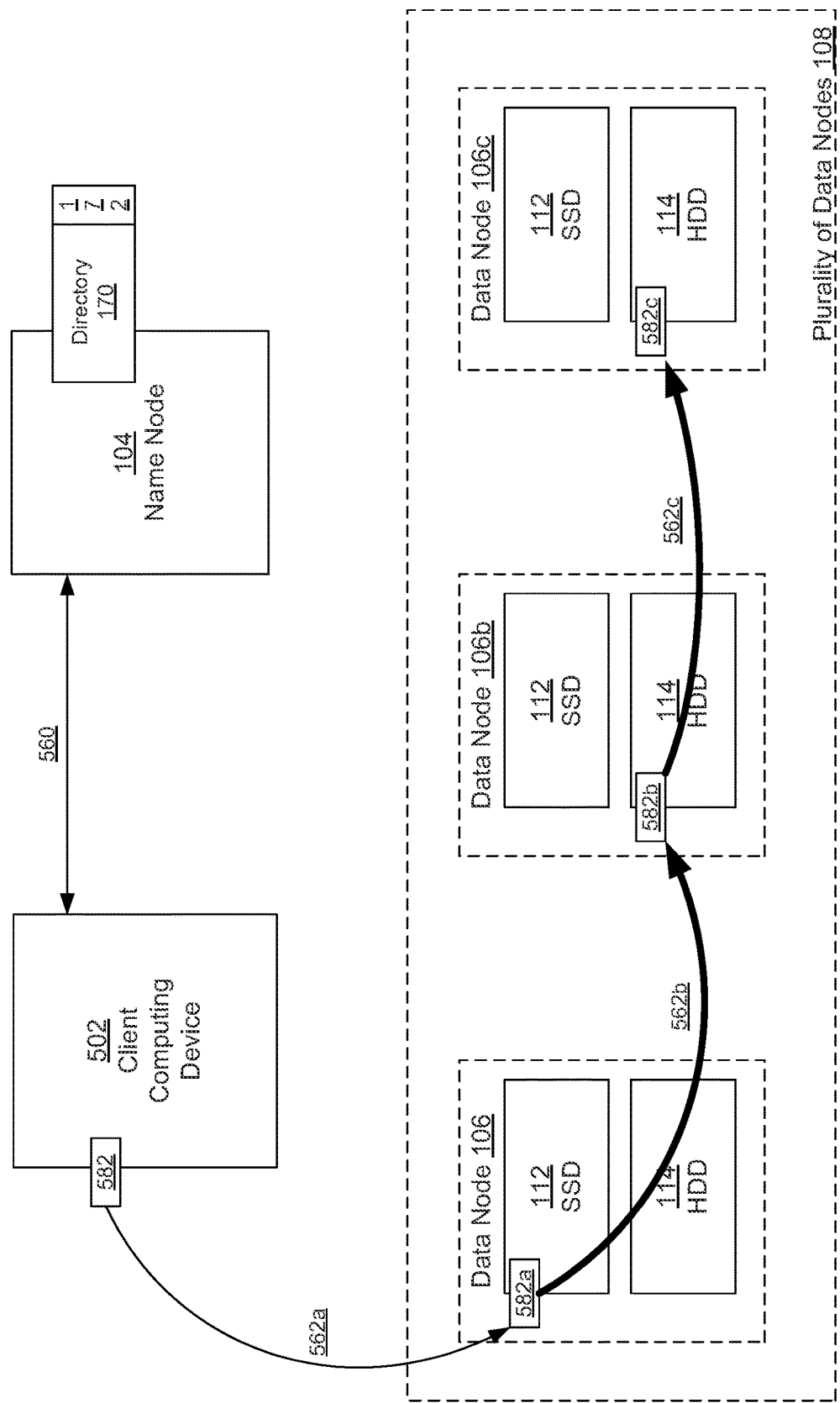
FIG. 5 is a block diagram of an example embodiment of a system in accordance with the disclosed subject matter.

In such an embodiment, a single data node may be chosen to store a fast or "hot" copy of the active data within the faster SSD 112. Other data nodes may then be chosen to store slower or "cold" redundant copies of the data within the slower HDD 114. In various embodiments, as the fast or "hot" copy of the data is modified (e.g., written to, etc.), the changes may be repeated or reflected in the slower or "cold" redundant copies of the data. One embodiment of this is illustrated in FIG. 5. It is understood that the above is merely one illustrative example to which the disclosed subject matter is not limited.

In the illustrated embodiment, the data node 106 may be selected as the data node to store the fast copy of data 182 (data 182a) within its SSD 112, data node 106b may be selected as the data node to store one of two slow copies of data 182 (specifically data 182b) within its HDD 114, and data node 106c may be selected as the data node to store the third total copy (or second slower copy) of data 182 (data 182c) within its HDD 114. It is understood that the above is merely one illustrative example to which the disclosed subject matter is not limited.

In various embodiments, the distributed file system 100 may be configured to distribute or spread out the fast or hot data copies amongst the data nodes such that contention within a data node for various pieces of data is reduced or minimized. In other embodiments, other criteria for the distribution of the fast or hot copies of data may be employed. It is understood that the above is merely one illustrative example to which the disclosed subject matter is not limited.

In the illustrated embodiment, as data node 106 may already store the fast copy of data 182a, the data node 106b may be selected as the data node to store the fast copy of data 184 (data 184a) within its SSD 112, data node 106 may be selected as the data node to store one of two slow copies of data 184 (specifically data 184b) within its HDD 114, and data node 106c may be selected as the data node to store the third and slower copy of data 184 (data 184c) within its HDD 114. Likewise, as data nodes 106 and 106b are already storing the fast copies of data 182 and 184 (respectively), the data node 106c may be selected as the data node to store the fast copy of data 186 (data 186a) within its SSD 112, data node 106 may be selected as the data node to store one of two slow copies of data 186 (specifically data 186b) within its HDD 114, and data node 106c may be selected as the data node to store the third and slower copy of data 186 (data 186c) within its HDD 114. It is understood that the above are merely a few illustrative examples to which the disclosed subject matter is not limited.

Figure 2:
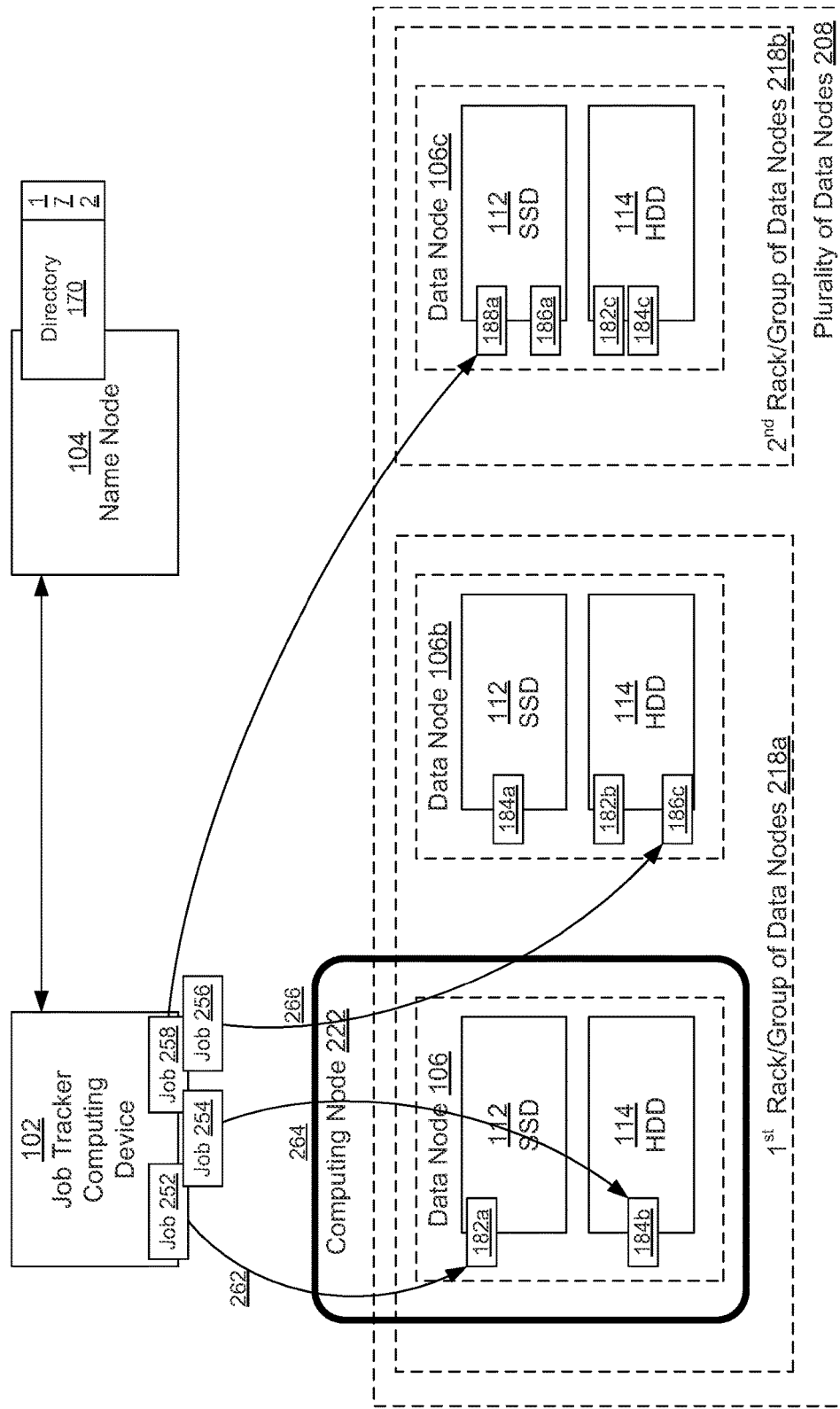
FIG. 2 is a block diagram of an example embodiment of a system in accordance with the disclosed subject matter.

In various embodiments, the distribution and assignment of the copies of the data amongst the plurality of data nodes 108 may be more complex. For example, the plurality of data nodes 106 may be divided into groups or racks (as seen in FIG. 2). In such an embodiment, the redundant copies of the data may be spread out to various groups or confined within certain groups. In another embodiment, the co-locating of the fast copies of the data with the computing devices or nodes configured to access the data may be considered more important than spreading the fast copies out amongst all possible SSD 112s. In yet another embodiment, other distribution and redundancy criteria may be employed. In such an embodiment, the criteria may be predefined within the distributed file system 100. It is understood that the above are merely a few illustrative examples to which the disclosed subject matter is not limited.

In various embodiments, the distributed file system 100 may include a name node 104. In one embodiment, the name node 104 may be configured to maintain a directory tree 170 of pieces of data (e.g., data 182, 184, 186, etc.) stored by the plurality of data nodes 108. In such an embodiment, when a computing device (e.g., device 102, etc.) wishes to access a piece of data (e.g., data 182a, etc.), it may contact the name node 104 and request information on the storage of the data. In one embodiment, the name node 104 itself may act as an intermediary and forward the data access request (e.g., read request, write request, etc.). Alternately, such as in the illustrated embodiment, the name node 104 may indicate to the requesting computing device (e.g., device 102) which data node 106 and/or storage address includes the desired piece of data (e.g., data 182a). It is understood that the above are merely a few illustrative examples to which the disclosed subject matter is not limited.

In the illustrated embodiment, the directory tree 170 may include, for each piece of data, an indication 172 as to which data node, if any, stores the respective fast copy of the data. For example, for data 182, the directory tree 170 may indicate that the fast copy of the data 182a is stored within the SSD 112 of the data node 106. Likewise, for data 184, the directory tree 170 may indicate that the fast copy of the data 184a is stored within the SSD 112 of the data node 106b, and so on. In such an embodiment, a piece of data may not have a fast copy (e.g., all copies of the data may be stored in the HDDs 114, etc.). In such an embodiment, the indication 172 may include the data node that stores a designated primary copy of the data. In such an embodiment, the primary copy of the data may be a copy of inactive data that, if made active, may be moved to the data node's SSD 112 (and hence considered the fast copy of the data). It is understood that the above are merely a few illustrative examples to which the disclosed subject matter is not limited.

As described above, in various embodiments, the distributed file system 100 may be part of a distributed computing system. As such, various computing tasks or jobs 150 may be distributed amongst the computing nodes of the distributed computing system for processing.

In this example embodiment, the data nodes 106 may be included within a computing node of the distributed computing system, and may therefore be configured to execute or process these various tasks or jobs 150. This is illustrated more overtly in FIG. 2.

In the illustrated embodiment of FIG. 1, the distributed computing system may include a job tracker 102. In various embodiments, the job tracker 102 may include a computing device that, in turn, includes hardware and/or software components similar or analogous to those of the data node 106 (e.g., processor 142, OS 147, etc.). In various embodiments, the job tracker 102 may be configured to assign various computing tasks or jobs 150 to respective computing nodes or, in this illustration, data nodes 106.

In such an embodiment, the job tracker 102 may receive or already include a given job 150. In the illustrated embodiment, the job 150 may be associated with or need to access (e.g., read, write, etc.) a certain piece of data. In this example, the piece of data may be data 182. In such an embodiment, the job tracker 102 may wish to assign the job 150 to a computing node that has the fastest possible access to the associated data 182. In other embodiments, other assignment criteria may be employed.

In the illustrated embodiment, the job tracker 102 may communicate with the name node 104 to determine which data node (106, 106b or 106c) has the fast copy of the data (in this example, data 182a, on Data Node 106). In such an embodiment, upon receiving the information request message from the job tracker 102, the name node may examine its directory tree 170 and the indications 172. The name node 104 may determine that a fast copy of the data 182 exists and is stored upon the SSD 112 of data node 106. In such an embodiment, the name node 106 may provide this information to the job tracker 102.

In the illustrated embodiment, once the job tracker 102 knows the storage location of the associated piece of data 182a, it may assign the job 150 to the data node 106 that includes the fast piece of data 182a, or it may assign the job 150 to a computing node (represented in FIG. 1 by the data nodes) that has the greatest or quickest available access to the associated data 182a. It is noted that in this simplified example, the job tracker 102 does not assign the job 150 to either of the data nodes 106b or 106c that include the slower copies of the data 182b and 182c. More complex examples and embodiments are described in relation to FIGS. 2 and 3 below. It is understood that the above is merely one illustrative example to which the disclosed subject matter is not limited.

Likewise, if the job 150 had been associated with the data 184, it may have been assigned to the data node 106b that includes the fast copy of the data 184a, and so on with a job associated with data 186. If the job 150 had been associated with multiple pieces of data (e.g., both data 182 and 184, etc.), the job tracker 102 may be configured to determine or estimate which data node or computing node would complete the job 150 most quickly. In such an embodiment, criteria such as, but not limited to, congestion, processing load, data node locality, data usage or preference, etc. may be taken into consideration when determining which node to assign the job. It is understood that the above are merely a few illustrative examples to which the disclosed subject matter is not limited.

FIG. 2 is a block diagram of an example embodiment of a system 200 in accordance with the disclosed subject matter. FIG. 2 shows two variations of various embodiments of the disclosed subject matter. It is understood that these variations need not (but may) occur within the same embodiment and may occur with any other embodiments or variations shown herein.

In the illustrated embodiment, the grouping of data nodes into groups (or racks) is shown. Further, a more complex example of job assignment within a heterogeneous distributed file system is also shown. It is understood that the above are merely a few illustrative examples to which the disclosed subject matter is not limited.

In the illustrated embodiment, the distributed file system 200 may include a name node 104 and a plurality of data nodes 208. In the illustrated embodiment, the plurality of data nodes 208 may include a number of data nodes (e.g., data node 106, 106b, 106c, etc.).

In the illustrated embodiment, the plurality of data nodes 208 may be grouped into data groups (e.g., data group 218a, data group 218b, etc.). In various embodiments, each data group may include one or more data nodes 106. In some embodiments, the members of a group may be located in the same physical location and even within the same enclosure or piece of equipment. In such an embodiment, a group may be referred to as a "rack", indicating that the group is often housed within the same mechanical enclosure. Often in such an embodiment, the data nodes 106 within the same rack (e.g., data group 218a) may share a common bus or backplane and may therefore be able to communicate more quickly and efficiently between group members (e.g., between data nodes 106 and 106b) than with data nodes outside the group (e.g., data node 106c, etc.). It is understood that the above is merely one illustrative example to which the disclosed subject matter is not limited.

In various embodiments, the determination or criteria employed to define a data group may include physical location, or, in another embodiment, it may include additional or other factors. In various embodiments, these factors may include, for example, the ownership of the data node (e.g., data nodes owned or associated with a particular department of a company, a tenant of a software-as-a-service (SaaS) system, etc.), a type or hardware/software configuration of the data nodes (e.g., a group of data nodes the include x86 or ARM processors, etc.), a security concern (e.g., data nodes that house classified data or data protected by a set of certain, common passwords, etc.), etc. It is understood that the above are merely a few illustrative examples to which the disclosed subject matter is not limited.

In addition, in the illustrated embodiment, the distributed computing system may include a computing node 222. In various embodiments, the computing node 222 may include the data node 106. Unlike the description above regarding FIG. 1, the data nodes 106b and 106c may not include computing nodes or may include their own respective computing nodes (i.e., other computing nodes aside from computing node 222).

In the illustrated embodiment, the job tracker 102 may include a centralized scheduler. In various embodiments, the job tracker may include a computing function or service that is separate and conceptually distinct from computing nodes or physical devices. In a preferred embodiment, the job tracker 102 and various computing nodes may not be included within in a single machine.

In various embodiments, the job tracker 102 may be configured to schedule tasks across data nodes (which can be called worker nodes or task trackers). In the illustrated embodiment, the job tracker 102 may include or be associated with four jobs 252, 254, 256, and 258 to assign to various computing nodes.

In the illustrated embodiment, the job 252 may be associated with the data 182, the job 254 may be associated with the data 184, the job 256 may be associated with the data 186, and the job 258 may be associated with the data 188. In the illustrated embodiment, a more complex scheme of assigning jobs based upon the associated data and taking advantage of the speed (or other criteria) of the heterogeneous distributed file system 200 is shown. In various embodiments, the assignment may include instructing a computing node to make use of a particular copy of data (e.g., a fast copy, a slow copy, etc.). In another embodiment, the assignment may include assigning jobs to particular computing nodes. It is understood that the above are merely a few illustrative examples to which the disclosed subject matter is not limited.

In one embodiment, the job tracker 102 may assign all jobs (e.g., jobs 252, 254, 256, and 258, etc.) to the computing node 222. The job tracker 102 may also direct the computing node 222 to perform the respective jobs using specific pieces of data (e.g., data 182a vs. data 182b, etc.). During the assignment process, the job tracker 102 may query the name node 104 to determine what pieces of data exist and upon which storage media they are stored. As described above, the name node 104 may make use of the directory tree 170 and the associated fast copy indication 172 to provide this information to the job tracker 102. Furthermore, the job tracker 102 may be aware of what data nodes comprise the respective data groups. In some embodiments, this may be learned from the name node 104.

When assigning the job 252 to the computing node 222, the job tracker 102 may attempt to determine which copy or piece of data would be the fastest or easiest for the computing node 222 to access. In the illustrated embodiment, the job tracker 102 may determine that a fast copy of the data (data 182a) is stored within the very same computing device as the computing node 222 (i.e. the data is local, etc.). In such an embodiment, the data 182a may be both fast and local and therefore the job tracker 102 may assign the data copy 182a to the job 252.

In the case of job 254, the job tracker 102 may have a less ideal choice as to the copy of data used. Data 184b may be local or within the same computing device as the computing node 222, but it may be stored within the slower storage medium (HDD 114 of data node 106). Conversely, the data 184a may be stored within the faster storage medium (SSD 112 of data node 106b), but may be stored outside of the computing node 222, on data node 106b (i.e. non-locally). In such an embodiment, the job tracker 102 may be configured to weigh the speed increase provided by local data access (e.g., within the same computing device) against the speed increase provided by the faster storage medium (e.g., the SSD 112 of data node 106b). In the illustrated embodiment, the job tracker 102 may assign the data copy 184b to the job 254. It is understood that the above is merely one illustrative example to which the disclosed subject matter is not limited.

In the case of job 256, the job tracker 102 may have an even less ideal choice as to the copy of data used. Data 186c may be within the same data group or rack as the computing node 222 (i.e. data group 218a), but it may be stored within the slower storage medium (HDD 114 of data node 106a). Conversely, the data 186a may be stored within the faster storage medium (SSD 112 of data node 106c), but may be stored within a completely different data group or rack, on data node 106c. In such an embodiment, the job tracker 102 may be configured to weigh the speed decrease incurred by remote data access (e.g., outside the data group) against the speed decrease incurred by the slower storage medium (e.g., the HDD 114 of data node 106b of the data group 218a). Traditionally, the speed decrease incurred by accessing a remote price of data may be very large. In the illustrated embodiment, the job tracker 102 may assign the rack-local data 186c to the job 256. It is understood that the above is merely one illustrative example to which the disclosed subject matter is not limited.

In the case of job 258, the job tracker 102 options may be more constrained. Data 188 may not be stored locally (within data node 106), or even semi-locally or rack-locally (within the data group 218a). The data may be stored within a data group remote from the computing node 222 (e.g., within the data node 106c of data group 218b, etc.). In such an embodiment, the job tracker 102 may assign the data 188a to the job 258. In another embodiment, the data 188 may exist within multiple data nodes that are external to the local data group (i.e. data group 218a). In such an embodiment, the job tracker 102 may factor in whether the data is stored within a fast storage medium (e.g., SSD 112 of data node 106c) or a slow storage medium (e.g., a HDD 114, etc.), or comparative access times between the remote data groups. It is understood that the above are merely a few illustrative examples to which the disclosed subject matter is not limited.

Figure 3:
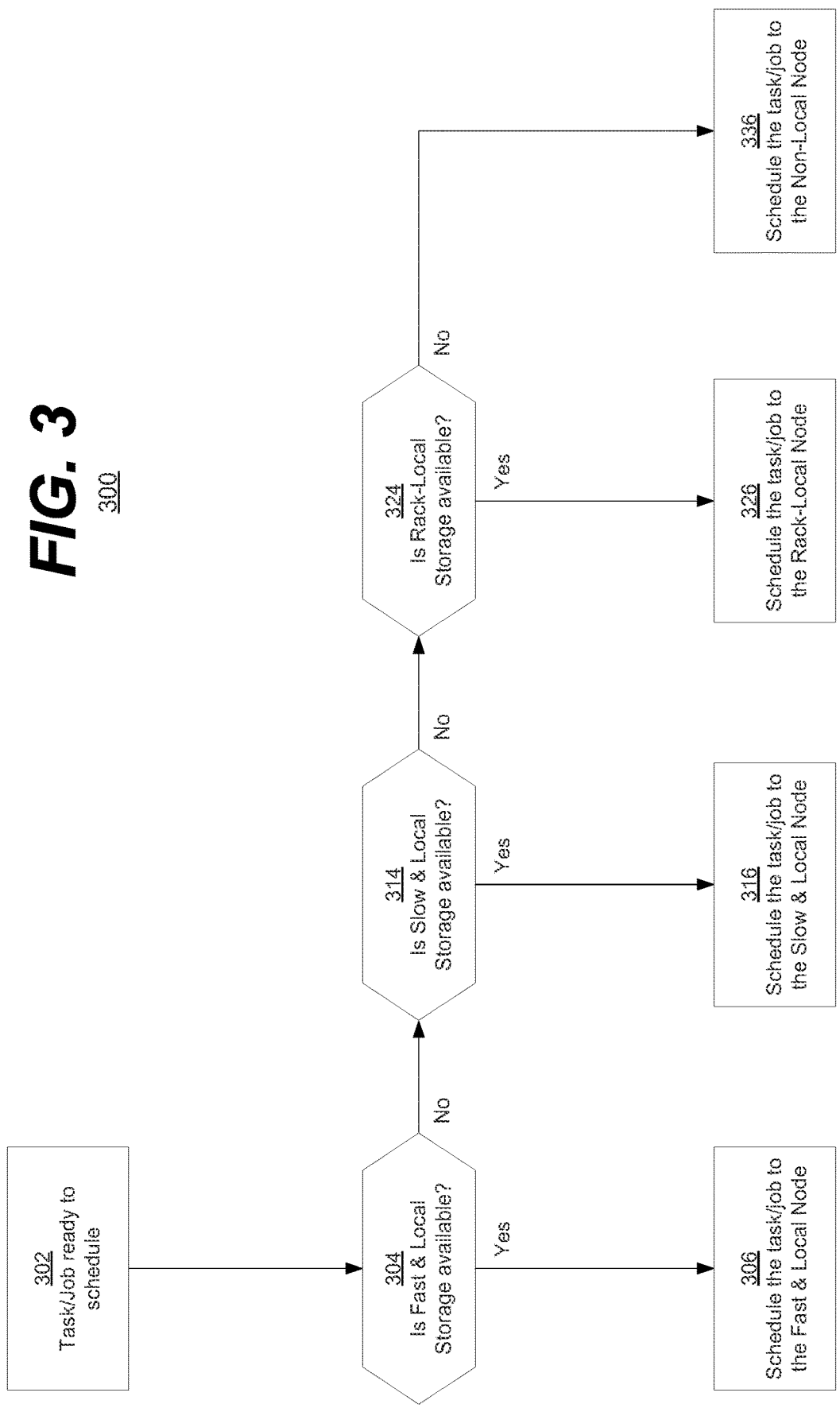
FIG. 3 is a flowchart of an example embodiment of a technique in accordance with the disclosed subject matter.

FIG. 3 is a flowchart of an example embodiment of a technique 300 in accordance with the disclosed subject matter. In various embodiments, the technique 300 may be used or produced by the systems such as those of FIG. 1, 2, 4, 5, 6, or 7. Although, it is understood that the above are merely a few illustrative examples to which the disclosed subject matter is not limited. It is understood that the disclosed subject matter is not limited to the ordering of or number of actions illustrated by technique 300.

Block 302 illustrates that, in one embodiment, a computing task or job may be received by a job tracker or otherwise be made ready for scheduling or assignment. In response to this, the job tracker may determine what data is associated with the job and where the associated data is stored within the heterogeneous distributed file system.

Block 304 illustrates that a first preference may be given to scheduling or assigning that job to a computing node that is local to the storing data node, and in which that data is stored within the fast storage medium of the data node. In such an embodiment, the data may be considered both fast and local. Block 306 illustrates that, in one embodiment, if a fast and local copy of the data is available, the job may be scheduled in such a way (e.g., assignment to a computing node, a direction to use that specific copy of the data, etc.) so as to use that fast and local piece of data. It is understood that the above is merely one illustrative example to which the disclosed subject matter is not limited.

Block 314 illustrates that a second preference may be given to scheduling or assigning that job to a computing node that is local to the storing data node, but in which that data is stored within the slow storage medium of the data node. In such an embodiment, the data may be considered local but slow. Block 316 illustrates that, in one embodiment, if a local but slow copy of the data is available, the job may be scheduled in such a way (e.g., assignment to a computing node, a direction to use that specific copy of the data, etc.) so as to use that local but slow piece of data. It is understood that the above is merely one illustrative example to which the disclosed subject matter is not limited. As described above, it is understood that the disclosed subject matter is not limited to the ordering of or number of actions illustrated by technique 300 and that order of preferences may be changed based on criteria, such as, for example, the exact connection latency, storage access time profiles, etc.

Block 324 illustrates that a third preference may be given to scheduling or assigning that job to a computing node that is within the same rack or data group as the storing data node. Block 326 illustrates that, in one embodiment, if a copy of the data is available within the same rack, the job may be scheduled in such a way (e.g., assignment to a computing node, a direction to use that specific copy of the data, etc.) so as to use that rack-local piece of data. It is understood that the above is merely one illustrative example to which the disclosed subject matter is not limited. As described above, it is understood that the disclosed subject matter is not limited to the ordering of or number of actions illustrated by technique 300 and that order of preferences may be changed based on criteria, such as, for example, the exact connection latency, storage access time profiles, etc.

Block 336 illustrates that, in one embodiment, that if no copy of the data exists that is at least rack-local, the job may be scheduled in such a way (e.g., assignment to a computing node, a direction to use that specific copy of the data, etc.) so as to use that non-rack-local piece of data. In various embodiments, other preferences or tiers of preferences may be employed to differentiate between various pieces of data that are stored externally to the local rack or data group. It is understood that the above are merely a few illustrative examples to which the disclosed subject matter is not limited.

Figure 4:
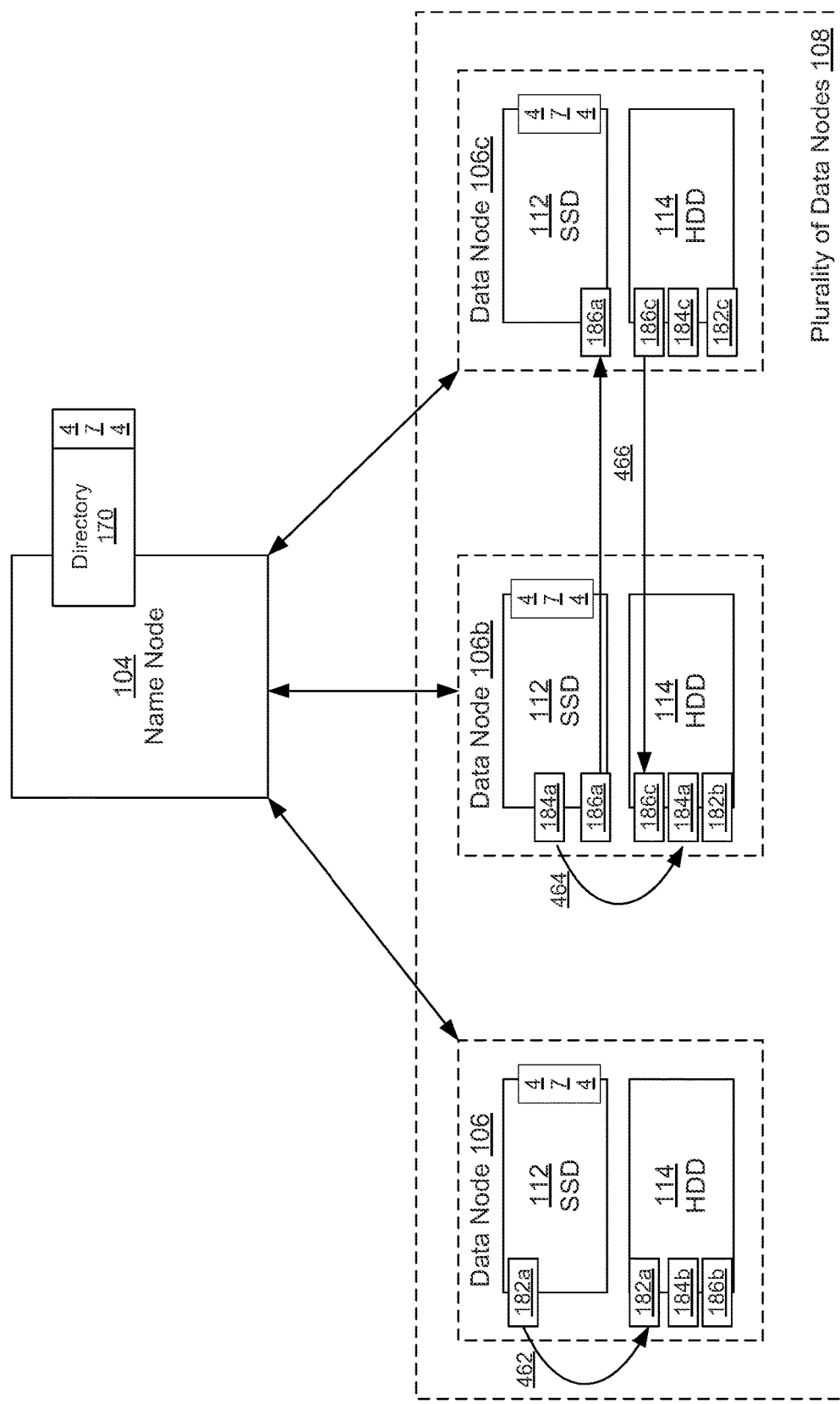
FIG. 4 is a block diagram of an example embodiment of a system in accordance with the disclosed subject matter.

FIG. 4 is a block diagram of an example embodiment of a system 400 in accordance with the disclosed subject matter. FIG. 4 shows a variation of an embodiment of the disclosed subject matter. It is understood that this variation need not (but may) occur with any other embodiments or variations shown herein.

In the illustrated embodiment, the heterogeneous distributed file system 400 may include the name node 104 and a plurality of data nodes 108. In the illustrated embodiment, the plurality of data nodes 108 may include the data nodes 106, 106b, and 106c. It is understood that the above is merely one illustrative example to which the disclosed subject matter is not limited.

In various embodiments, the heterogeneous distributed file system 400 may be configured to operate as a first-in-first-out (FIFO) manner or a pseudo-FIFO manner. In such an embodiment, the distributed file system 400 may be configured to keep active or most recently used copies of the various pieces of data within the fast storage mediums (e.g., SSD 112s, etc.). In such an embodiment, the name node 104 may include an active flag, bit, or field 474 that indicates whether a piece of data should have a copy stored within an SSD 112. In some embodiments, the active flag, bit, or field 474 may be stored with the data itself or within the data node 106. It is understood that the above are merely a few illustrative examples to which the disclosed subject matter is not limited.

In one embodiment, the distributed file system 400 may employ an expiration time or timer as part of the active flag 474. In such an embodiment, when the data is written to the SSD 112 an expiration time may be set (e.g., 1 hour into the future, 10 minutes, etc.). In such an embodiment, when the expiration time has expired, the data may be moved from the SSD 112 to the HDD 114, clearing space within the smaller SSD 112 for more data.

In one specific embodiment, as data 182a is written to the SSD 112 of data node 106 the expiration time 474 may be set to a predefined value. In the illustrated embodiment, this expiration time may be the active flag 474 associated with the directory tree 170. In such an embodiment, the name node 104 may periodically scan the active flags 474 to determine if any data's expiration time has passed or expired. If so, the name node 104 may send a message to the data node 106 to move the data 182a from the SSD 112 to the HDD 114 (illustrated by arrow 462). In some embodiments, the expiration time may reside within the data node 106 itself, and the management of the storage of the data 182*a* may be handled by the data node 106 without the name node 104's intervention. The management of the data storage may be considered or thought of as a background process conducted by the data node 106. In such an embodiment, a message may be sent, to the name node 104, reporting such activity. It is understood that the above are merely a few illustrative examples to which the disclosed subject matter is not limited.

In another specific embodiment, the management of the data stored within an SSD 112 may occur when new data is being entered into the SSD 112, but not enough free storage space exists for the new data. For example, the SSD 112 of data node 106*b* may be essentially full. However, it may be desirable to store data 186*a* within SSD 112. In such an embodiment, the data node 106*b* or name node 104 may examine the active flags 474 associated with the various pieces of data already stored within the SSD 112 (e.g., the active flag of data 184*a*, etc.), and determine which data to evict from the SSD 112 in order to make room for the new data 186*a*.

In one embodiment, the system 400 may employ a most-recently used (MRU) scheme in which the least recently used (LRU) data is evicted (i.e. moved to the HDD 114). In such an embodiment, every time the data is accessed the active flag 474 may be updated to note the activity. In another embodiment, the system 400 may employ a variation of the eviction time scheme in which the data with the most expired eviction timer is evicted. It is understood that the above are merely a few illustrative examples to which the disclosed subject matter is not limited.

In such an embodiment, it may be determined that the data 184*a* is the least active (e.g., least recently used, nearest the end of the expiration timer, etc.) and is to be evicted or moved from the SSD 112 to the HDD 114 (illustrated by arrow 464). In one embodiment, the name node 104 may make this determination and initiate the action. In another embodiment, the data node 106*b* may be configured to perform the action without external involvement, and inform the name node 104 that the data 184*a* is no longer a fast copy of the data 184. It is understood that the above are merely a few illustrative examples to which the disclosed subject matter is not limited.

The system 400 may also be configured to conduct load balancing between the data nodes. In one embodiment, load balancing may occur within the plurality of data nodes 108 to reduce congestion occurring to any one data node (or subset of data nodes). In yet another specific example, the data node 106*b* may store a number of pieces of data (e.g., data 184*a* and 186*a*) within its SSD 112. It may be desirable to spread that fast data to other data nodes. In such an embodiment, the name node 104 may instruct that the fast copy of the data 186*a* be moved from data node 106*b* to data node 106*c* (illustrated by arrows 466). In such an embodiment, a slow copy of the data 186 may already exist within the data node 106*c*, and the name node 104 may cause that slow copy to be moved from data node 106*c* to data node 106*b* (also illustrated by arrows 466). In such an embodiment, it may be more efficient for the data to move between the SSD 112 and HDD 114 within the same data node, as opposed to the illustrated transfer between the data nodes 106*b* and 106*c*, but the overall effect may be the same. It is understood that the above is merely one illustrative example to which the disclosed subject matter is not limited.

It other cases it may not be desirable to perform such load balancing. For example, it may be advantageous for various pieces of data to be co-located within a single data node or within a single data group or rack. It is understood that the above are merely a few illustrative examples to which the disclosed subject matter is not limited.

In some embodiments, the load balancing may include load-leveling or other background processes employed in conjunction with maintenance of the SSD 112*s*. In various embodiments, these maintenance processes may differ based upon the technology used for the first storage medium 112 and the second storage medium 114. It is understood that the above is merely one illustrative example to which the disclosed subject matter is not limited.

FIG. 5 is a block diagram of an example embodiment of a system 500 in accordance with the disclosed subject matter. FIG. 5 shows a variation of an embodiment of the disclosed subject matter. It is understood that this variation need not (but may) occur with any other embodiments or variations shown herein.

In the illustrated embodiment, the heterogeneous distributed file system 500 may include the name node 104 and a plurality of data nodes 108. In the illustrated embodiment, the plurality of data nodes 108 may include the data nodes 106, 106*b*, and 106*c*. It is understood that the above is merely one illustrative example to which the disclosed subject matter is not limited.

In the illustrated embodiment, a client computing device 502 may wish to write data to the distributed file system 500. In various embodiments, the client computing device 502 may include hardware and/or software components similar or analogous to those described in reference to the data node 106 of FIG. 1. In various embodiments, the client computing device 502 may include a computing node. In another embodiment, the client computing device 502 may not be a computing node or any other node of a distributed computing system, for example, the client computing device 502 may be a separate device merely accessing the distributed file system 500. It is understood that the above are merely a few illustrative examples to which the disclosed subject matter is not limited.

In the illustrated embodiment, the client computing device 502 may request the storage address or data node 106 that stores or will store the data 582. Data 582 may be the piece of data that is to be written to the distributed file system 500. In various embodiments, the name node 104 may determine which data node includes or will include the fast copy (data 582*a*) of the data 582. In various embodiments, it may examine the directory 170 and the fast copy indications 172 to determine this data node, as described above. The name node 104 may then respond with this information (these actions are illustrated by arrow 560).

Upon receiving the storage address or data node 106 that will store the fast copy of the data 582, the client computing device 502 may perform the data or write access to data node 106 (illustrated by arrow 562*a*). In such an embodiment, the first copy of the data 582 may be the fast copy of the data 582*a*. It is understood that the above is merely one illustrative example to which the disclosed subject matter is not limited.

In the illustrated embodiment, once a copy of the data 582 has been written to the distributed file system 500, the client computing device 502 may consider its data access to be complete. In such an embodiment, it may fall upon the distributed file system 500 to update any redundant copies of the data 582 (e.g., data 582*b* and data 582*c*, etc.) with the new information provided by the client computing device 502.

In such an embodiment, the data node 106 may be configured to write the new data 582*a* to a second slower redundant copy of the data 582, data 582*b*. In such an embodiment, the data node 106 may initiate a data access to the data node 106*b* that stores the data 582*b* within its HDD 114 (illustrated by arrow 562*b*). Likewise, it may become the responsibility of the data node housing the second copy of the data 582 to write the new version of the data to the third copy data 582*c* (illustrated by arrow 562*c*), and so on. In various embodiments, the process of making or updating redundant copies of the data 582 may be carried out as a background process. It is understood that the above is merely one illustrative example to which the disclosed subject matter is not limited.

Figure 6:
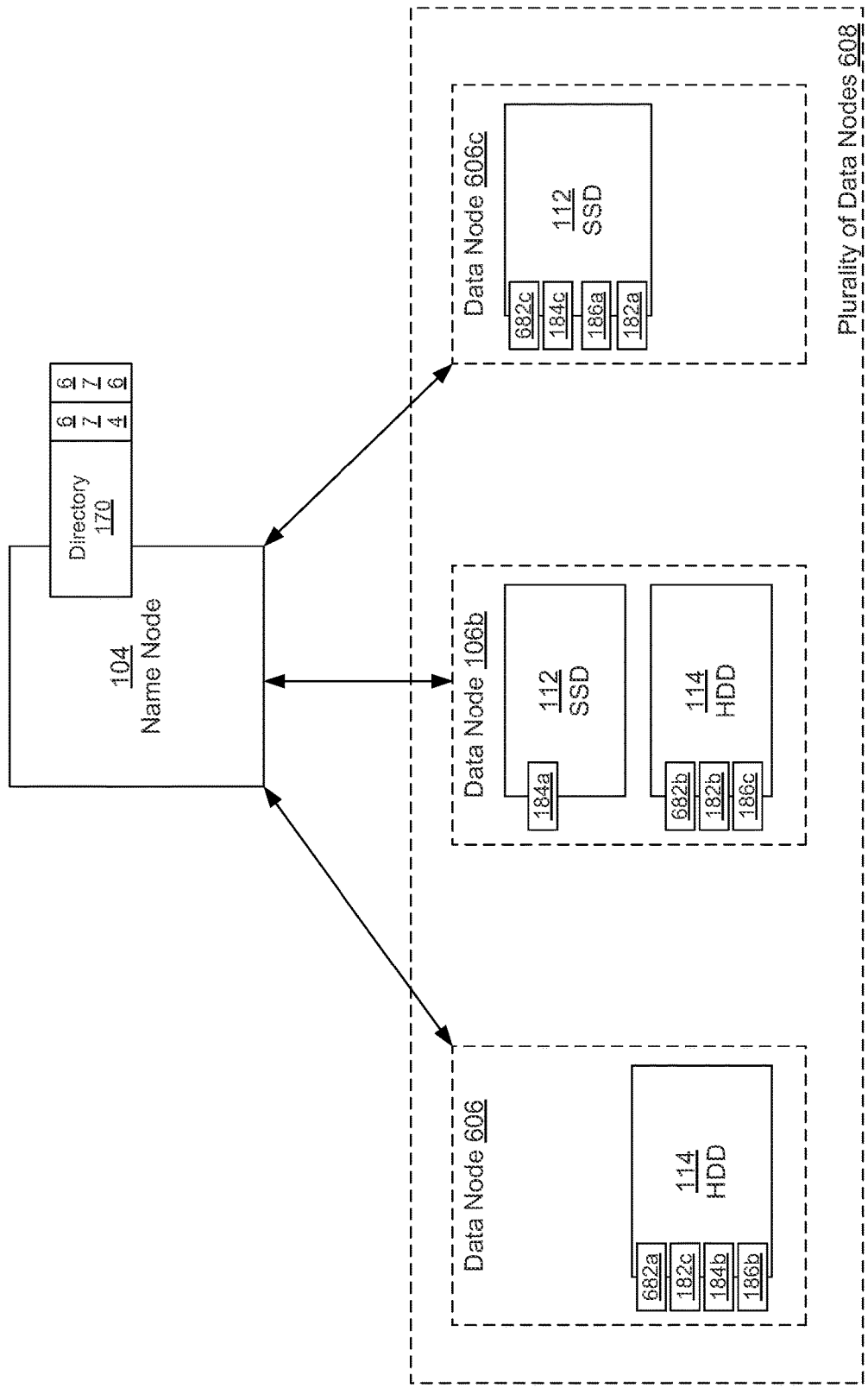
FIG. 6 is a block diagram of an example embodiment of a system in accordance with the disclosed subject matter.

FIG. 6 is a block diagram of an example embodiment of a system 600 in accordance with the disclosed subject matter. FIG. 6 shows a variation of an embodiment of the disclosed subject matter. It is understood that this variation need not (but may) occur with any other embodiments or variations shown herein.

In the illustrated embodiment, the heterogeneous distributed file system 600 may include the name node 104 and a plurality of data nodes 608. In the illustrated embodiment, the plurality of data nodes 108 may include the data nodes 606, 106*b*, and 606*c*. It is understood that the above is merely one illustrative example to which the disclosed subject matter is not limited.

In the illustrated embodiment, the plurality of data nodes 608 may be even more heterogeneous than illustrated in FIGS. 1, 2, 4, and/or 5. In those figures the data nodes each included both a first storage medium (SSD 112) and a second storage medium (HDD 114). In the illustrated embodiment of FIG. 6, the data nodes may differ in that they need not include both a first and a second storage medium.

In the illustrated embodiment, data node 606 may only include the second storage medium (HDD 114) and may therefore be incapable of storing a fast copy of the data. However, this need not mean that the data node 606 is incapable of storing an active copy of the data, merely that such a copy would not be a fast copy. For example, the data node 606 may store a copy of the data 682*a* that is considered active but slow. In such an embodiment, any data access to the data 682 may occur to data 682*a* via the data node 606. The redundant copies of data 682*b* and 682*c* may be stored within the data nodes 106*b* and 606*c*. Conversely, while the fast, active copy of data 182 was stored in data node 106 of FIG. 1, a fast, active copy of data 182 may be stored within the SSD 112 of data node 606*c* in FIG. 6. It is understood that the above are merely a few illustrative examples to which the disclosed subject matter is not limited.

In the illustrated embodiment, data node 106*b* may include both an SSD 112 and an HDD 114. In such an embodiment, the data node 106*b* may function as previously described in reference to the other figures. It is understood that the above is merely one illustrative example to which the disclosed subject matter is not limited.

In the illustrated embodiment, data node 606*c* may only include the first storage medium (SDD 112) and may therefore be incapable of storing a slow copy of the data. However, this need not mean that the data node 606*c* is incapable of storing an inactive or redundant copy of data, merely that such a copy would be stored in the fast storage medium (SSD 112). For example, the data node 606*c* may store the active and fast data 182*a* and 186*a*. In addition, the redundant copies of data 184*c* and 682*c* may also be stored in the SSD 112 of data node 606*c*. It is understood that the above are merely a few illustrative examples to which the disclosed subject matter is not limited.

In such an embodiment, the rules of redundancy, load balancing, etc. may be modified compared to a heterogeneous distributed file system in which all data nodes include both the fast and slow storage mediums. For example, the number of redundant copies of data may be reduced, or a prohibition against having two redundant copies within the same data node may be relaxed (e.g. the data node 106*b* may include data 184*a* in the SSD 112 and data 184*c* in the HDD 114, etc.). In some embodiments, this may reduce the amount of data stored within the SSD 112*s*, which may have limited storage. It is understood that the above are merely a few illustrative examples to which the disclosed subject matter is not limited.

In various embodiments, the name node 104 may include information 676 indicating what are the storage medium capabilities of the various data nodes (e.g., has only a slow storage medium, has both storage mediums, etc.), and/or an indication 674 of where the active data is located (as opposed to merely indicating where a fast copy of the data is located). It is understood that the above are merely a few illustrative examples to which the disclosed subject matter is not limited.

FIG. 7 is a schematic block diagram of an information processing system 700, which may include semiconductor devices formed according to principles of the disclosed subject matter.

Referring to FIG. 7, an information processing system 700 may include one or more of devices constructed according to the principles of the disclosed subject matter. In another embodiment, the information processing system 700 may employ or execute one or more techniques according to the principles of the disclosed subject matter.

In various embodiments, the information processing system 700 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 700 may be used by a user (not shown).

The information processing system 700 according to the disclosed subject matter may further include a central processing unit (CPU), logic, or processor 710. In some embodiments, the processor 710 may include one or more functional unit blocks (FUBs) or combinational logic blocks (CLBs) 715. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 700 according to the disclosed subject matter may further include a volatile memory 720 (e.g., a Random Access Memory (RAM), etc.). The information processing system 700 according to the disclosed subject matter may further include a non-volatile memory 730 (e.g., a hard drive, an optical memory, a NAND or Flash memory, etc.). In some embodiments, either the volatile memory 720, the non-volatile memory 730, or a combination or portions thereof may be referred to as a "storage medium". In various embodiments, the volatile memory 720 and/or the non-volatile memory 730 may be configured to store data in a semi-permanent or substantially permanent form.

In various embodiments, the information processing system 700 may include one or more network interfaces 740 configured to allow the information processing system 700 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 700 according to the disclosed subject matter may further include a user interface unit 750 (e.g., a display adapter, a haptic interface, a human interface device, etc.). In various embodiments, this user interface unit 750 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 700 may include one or more other devices or hardware components 760 (e.g., a display or monitor, a keyboard, a mouse, a camera, a fingerprint reader, a video processor, etc.). It is understood that the above are merely a few illustrative examples to which the disclosed subject matter is not limited.

The information processing system 700 according to the disclosed subject matter may further include one or more system buses 705. In such an embodiment, the system bus 705 may be configured to communicatively couple the processor 710, the volatile memory 720, the non-volatile memory 730, the network interface 740, the user interface unit 750, and one or more hardware components 760. Data processed by the processor 710 or data inputted from outside of the non-volatile memory 730 may be stored in either the non-volatile memory 730 or the volatile memory 720.

In various embodiments, the information processing system 700 may include or execute one or more software components 770. In some embodiments, the software components 770 may include an operating system (OS) and/or an application. In some embodiments, the OS may be configured to provide one or more services to an application and manage or act as an intermediary between the application and the various hardware components (e.g., the processor 710, a network interface 740, etc.) of the information processing system 700. In such an embodiment, the information processing system 700 may include one or more native applications, which may be installed locally (e.g., within the non-volatile memory 730, etc.) and configured to be executed directly by the processor 710 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 710.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. A system comprising:
a first data node comprising:
a first storage medium having a first performance criterion;
a second storage medium having a second performance criterion that is substantially different from the first performance criterion; and
a second data node comprising a third storage medium having a third performance criterion;
wherein the system is configured to:
store a first copy of a piece of data in the first storage medium;
store a second copy of the piece of data in the third storage medium; and
schedule a computing job associated with the piece of data to the first data node based, at least in part, on the first performance criterion, second performance criterion, or third performance criterion, wherein the first performance criterion, second performance criterion, and third performance criterion are based on at least one of a speed, latency or throughput.

2. The system of claim 1, wherein the third performance criterion is substantially the same as the second performance criterion.

3. The system of claim 1, wherein the third performance criterion is substantially different from the second performance criterion.

4. The system of claim 1, wherein the first performance criterion comprises a first speed, and the third performance criterion comprises a second speed.

5. The system of claim 4, wherein the first speed is substantially faster than the second speed.

6. The system of claim 4, wherein the first speed is substantially slower than the second speed.

7. The system of claim 6, wherein the system is configured to assign the second copy of the piece of data to the computing job based, at least in part, on weighing a first speed associated with using the first copy of the piece of data and a second speed associated with using the second copy of the piece of data.

8. The system of claim 1, further comprising a third data node comprising a third storage medium having a fourth performance criterion.

9. The system of claim 1, wherein the system is configured to schedule the computing job associated with the piece of data to the first data node based, at least in part, on a fourth performance criterion of the first storage medium.

10. The system of claim 9, wherein the fourth performance criterion comprises a processing load.

11. The system of claim 9, wherein the fourth performance criterion comprises a completion time.

12. A method comprising:
storing a first copy of a piece of data in a first storage medium having a first performance criterion at a first data node, wherein the first data node comprises a second storage medium having a second performance criterion that is substantially different from the first performance criterion;
storing a second copy of the piece of data in a third storage medium having a third performance criterion at a second data node, wherein the third performance criterion is substantially different from the first performance criterion; and
scheduling a computing job associated with the piece of data to the first data node based, at least in part, on the first performance criterion, second performance criterion, or third performance criterion, wherein the first performance criterion, second performance criterion, and third performance criterion are based on at least one of a speed, latency or throughput.

13. The method of claim 12, wherein the third performance criterion is substantially the same as the second performance criterion.

14. The method of claim 12, further comprising performing background load balancing between the first data node and the second data node.

15. The method of claim 14, wherein performing the background load balancing is based on congestion within the first data node and the second data node.

16. The method of claim 12, further comprising maintaining a directory tree of the first copy of the piece of data in the first storage medium at the first data node and the second copy of the piece of data in the third storage medium at the second data node.

17. A method comprising:
arranging a distributed file system into a first tier comprising a storage medium having a first performance criterion and a second tier comprising a storage medium having a second performance criterion that is substantially different from the first performance criterion;
storing active data within the first tier;
storing inactive data within the second tier; and
determining a data node in the first tier to associate with a computing job based, at least in part, on the first performance criterion or second performance criterion, wherein the first performance criterion and second performance criterion are based on at least one of a speed, latency or throughput.

18. The method of claim 17, further comprising:
writing a first copy of a piece of data to the first tier, and writing one or more second copies of the piece of data to the second tier.

19. The method of claim 17, further comprising evicting data from the first tier into the second tier based on a usage of the data.

20. The method of claim 19, wherein the usage comprises a pseudo-first-in-first-out scheme.

* * * * *